US005693359A

United States Patent [19]

Wood

[11] Patent Number: 5,693,359

[45] Date of Patent: Dec. 2, 1997

[54] DRY FOOD ACIDULENT REMINISCENT OF VINEGAR AND FOOD MIXES CONTAINING IT

[76] Inventor: Robert W. Wood, R.F.D. #10, Brewster Hill Rd., Brewster, N.Y. 10509

[21] Appl. No.: 587,451

[22] Filed: Dec. 19, 1995

Related U.S. Application Data

[63] Continuation of Ser. No. 277,902, Jul. 20, 1994, abandoned.

[51] Int. Cl.$^6$ ........................ A23L 1/221; A23L 3/3463; A23L 1/226

[52] U.S. Cl. ........................ 426/650; 426/573; 426/576; 426/577; 426/578; 426/579; 562/590; 562/584; 562/595

[58] Field of Search .................................. 426/650, 573, 426/576, 577, 578, 589, 579; 562/590, 584, 595

[56] References Cited

U.S. PATENT DOCUMENTS

| | | | |
|---|---|---|---|
| 3,968,261 | 7/1976 | Goodman | 426/98 |
| 4,104,413 | 8/1978 | Wynn et al. | 426/582 |
| 4,143,175 | 3/1979 | Whelan et al. | 426/582 |
| 4,376,132 | 3/1983 | Eguchi et al. | 426/537 |
| 4,508,740 | 4/1985 | McSweeney | 426/250 |
| 4,596,715 | 6/1986 | Ballard et al. | 426/589 X |
| 4,643,907 | 2/1987 | Player et al. | 426/580 |
| 4,684,533 | 8/1987 | Kratochvil | 426/575 |
| 4,748,041 | 5/1988 | Player et al. | 426/601 |
| 4,927,657 | 5/1990 | Antaki et al. | 426/589 |
| 4,937,091 | 6/1990 | Zallie et al. | 426/582 |

*Primary Examiner*—Donald E. Czaja
*Assistant Examiner*—Choon P. Koh
*Attorney, Agent, or Firm*—St. Onge Steward Johnston & Reens LLC

[57] ABSTRACT

A dry food acidulent composition, reminiscent of vinegar when hydrated, comprises a dry food acid, a buffering salt and a fully dissociatable salt. The dry food acid preferably comprises adipic, citric, fumaric, malic acid or a mixture. The buffering salt is preferably a sodium or potassium salt of a food-grade acid such as sodium citrate, potassium citrate, disodium phosphate, dipostassium phosphate, and mixtures. The fully dissociatable salt is preferably sodium chloride or potassium chloride. The preferred weight ratio of the buffering salt to the acid is within the range of from about 0.1:1 to about 0.3:1, that of the fully dissociatable salt to the acid is within the range of from about 1:1 to about 6:1, and that of the fully dissociatable salt to the buffering salt is within the range of from about 10:1 to about 30:1. These compositions are admixed with other dry ingredients to prepare dry sauce and dressing mixes.

13 Claims, No Drawings

DRY FOOD ACIDULENT REMINISCENT OF VINEGAR AND FOOD MIXES CONTAINING IT

This application is a continuation of application Ser. No. 08/277,902, filed on Jul. 20, 1994 now abandoned.

TECHNICAL FIELD

The invention relates to improvements enabling the production of dry salad dressing and other sauce mixes which typically depend on the use of vinegar for their characteristic flavor and appeal. The compositions of the invention eliminate the problems associated with adding acetic acid to the mix either during manufacture or during hydration by the consumer.

Vinegar as a food ingredient must be used in its natural liquid state or their will be problems during manufacture and or storage. There are a number of different flavors of vinegar, but they all have the common feature that the acid taste comes from acetic acid—derived from the fermentation of ethyl alcohol with acetobacter. Acetic acid is typically available in concentrated form as a viscous liquid, glacial acetic acid. It is highly hygroscopic and cannot be practically dried to solid form.

Attempts to simulate the organoleptic effect of acetic acid by the use of other acids have not been successful. There is a present need for a dry food ingredient which effectively simulates the acid profile of acetic acid—in terms of bite and acid taste—and thus permit the preparation of dry mixes which do not require the addition of vinegar during preparation.

BACKGROUND ART

The problems associated with the desire to add dry vinegar to food mixes is well known. Attempts have been made to prepare a dry free-flowing powder reminiscent of natural vinegar by drying, adding desiccants or sorbents, and substituting components for those in natural vinegar. Each of these attempts has fallen short in one or more aspects.

In U.S. Pat. No. 2,609,298, G. W. Kirby describes the preparation of a composition characterized as dry and free flowing for imparting a tangy flavor to rye bread or other baked goods. The composition is made up of two components, the first being an organic food acid or salt such as fumaric acid, tartaric acid, citric acid, and potassium acid tartrate, and the second being acetic or propionic acids or one of its salts. In addition, the composition includes a significant amount of a dry, free-flowing carrier. However, compositions of this type, due to the presence of the acetic acid salt combined with another acid, tends to be unduly sensitive to moisture.

In U.S. Pat. No. 2,696,441, T. C. Kmieciek and T. Farrell disclose a dry imitation vinegar and process for making it. The composition is compounded by absorbing glacial acetic acid and a concentrated pure fruit essence on a solid binder of malic acid and sugar. This composition also tended to be hygroscopic and in U.S. Pat. No. 3,898,344, Y. Masuoka, K. R. Johnson and A. R. Rahman described in considerable detail the problems of hygroscopicity and packaging delamination experienced.

The improvement offered by Y. Masuoka, et al. in U.S. Pat. No. 3,898,344, comprised a packaged, dry, imitation vinegar composition. The composition included sodium diacetate, sodium acetate and dimalic acid. To achieve long term stability, it was essential to hermetically seal the composition in a moisture impermeable container also containing sufficient calcium oxide to reduce the moisture content to <0.1%. It was stated that prior art synthetic vinegars rapidly deteriorate on storage to form slurries which delaminate laminated packaging, thus permitting leakage to occur.

The approach of P. P. Noznick and C. W. Tatter in U.S. Pat. No. 3,445,244 was to spray dry aqueous vinegar with a carbohydrate gum or dextrin as an enrobing agent. In addition, gelatin or gluten could be employed. This product, like the others of the prior art employing acetic acid or one of its salts, could not avoid the problem of hygroscopicity.

In U.S. Pat. No. 3,346,396, A. Kitayama disclosed a reaction product of sodium glutamate and acetic acid as a dry seasoning. This material has the disadvantage that it requires a separate reaction phase to prepare and contains acetic acid.

In still another approach, in U.S. Pat. No. 3,630,756, R. A. Smith and J. A. F. Woods describe the preparation of a vinegar-type flavor composition. To achieve their objectives, they absorb a still residue resulting from the double distillation of vinegar in a material such as silica gel. Again, the product contains acetic acid and will have the stability problems associated therewith.

As another example of a condiment reminiscent of vinegar, in U.S. Pat. No. 3,672,914, W. E. Delaney discloses a mixture comprising sodium chloride and sodium diacetate. In an attempt to solve the problems associated with acetate salts, a water-soluble, nonhygroscopic solid coating is employed. The use of such a coating is expensive and can only partially correct the problems known for compositions of this type.

DISCLOSURE OF THE INVENTION

It is an object of the invention to provide a dry food acidulent composition, reminiscent of vinegar when hydrated, and food mixes incorporating the composition.

It is an object of a preferred embodiment of the invention to provide improved dry food acidulent and more complex dry food compositions, reminiscent of vinegar when hydrated, but which contain no acetate ion.

It is another object of the invention to provide an improved method for making dry food mixes by substituting for vinegar a nonhygroscopic dry food acidulent composition which is reminiscent of vinegar when hydrated.

It is a further object of the invention to enable the packaging of dry food mixes which have a flavor reminiscent of vinegar when hydrated, without the need for separate reaction steps, coatings, desiccants or absorbents.

It is a further object of the invention to provide improved dry food acidulent and more complex dry food compositions, reminiscent of vinegar when hydrated, which have a full acid flavor and good acid profile—providing good acid bite without a strong acid taste.

It is another specific object of the invention to provide improved dry food acidulent compositions reminiscent of vinegar when hydrated, which contain no acetic acid or acetic acid salt and which enable the packaging of dry food mixes which have a flavor reminiscent of vinegar when hydrated, without the need for separate reaction steps, coatings, desiccants or absorbents.

It is a still further object of a preferred embodiment of the invention to improve the acid flavor and good acid profile—providing good acid bite without a strong acid taste—for dry food acidulents and more complex dry food compositions, reminiscent of vinegar when hydrated, which contain no acetic acid or acetic acid salt and are prepared without the need for separate reaction steps, coatings, desiccants or absorbents.

In one aspect, the invention achieves these and other objectives by providing a dry food acidulent composition, reminiscent of vinegar when hydrated, comprising: dry food acid; at least one dry sodium or potassium buffering salt of at least one food-grade acid; and at least one sodium or potassium salt of chloride. In another, the invention provides a dry mix for rehydrating with water, comprising: a dry acidulent as just described, a flavoring component comprising spices, and a thickening component. In yet another, the invention improves the preparation of dry food mixes by substituting a dry food acidulent composition as described for vinegar.

The invention has also identified within these broad guidelines, specific formulations in terms of specific salts, acids and proportions of one to the other which achieve these objectives in a surprising manner. These formulations are described in detail below with reference to specific examples.

Industrial Applicability

The improvements of the invention have preferred application to the dry acidulent compositions per se and their incorporation into a variety of dry mixes for a wide variety of foods. The following description is centered on the preferred embodiments of salad dressing mixes and barbecue mixes, especially those which can be prepared by simply adding water and do not require the addition of either vinegar or oil and, in one case, a mix which contains essentially no sodium and no fat and yet tastes like one having both.

As noted, the invention in its broad terms provides dry food acidulent composition, reminiscent of vinegar when hydrated, comprising dry food acid, at least one dry sodium or potassium buffering salt of at least one food-grade acid, and at least one sodium or potassium salt of chloride.

The dry food acid preferably comprises a member selected from the group consisting of adipic, citric, fumaric, malic (preferably dimalic), and mixtures of at least two of these. Of these, citric acid is preferred.

The preferred buffering salt will comprise a member selected from the group consisting of sodium citrate, potassium citrate, disodium phosphate, dipostassium phosphate, and mixtures of at least two of these. Sodium citrate is preferred for most formulations, but the potassium salts are preferred for low-sodium formulations. It is an advantage of the invention that no acetate salts are necessary, and it preferred that they contain essentially zero percent of any acetate salt or acetic acid. The acetate salts, even though normally efflorescent, tend to rapidly pick up moisture when packaged with an acid component. And, once the hydration begins, acetic acid forms in the resulting aqueous solution, and even more water is attracted from the ambient atmosphere.

The preferred fully dissociatable salt is selected from the group consisting of sodium chloride, potassium chloride, and a mixture of sodium and potassium chlorides. For most formulations, the preferred salt is sodium chloride. In the embodiment where sodium is reduced, preferably to zero, the preferred cation is potassium.

In the compositions of the invention, the proportions of the various acid and salt components are of importance to the ability to achieve the desired flavor profile without the need for acetic acid or one of its salts. Preferably, the weight ratio of the buffering salt to the acid is within the range of from about 0.1:1 to about 0.3:1. Also preferably, the weight ratio of the fully dissociatable salt to the acid is within the range of from about 1:1 to about 6:1. And, it is preferred to maintain the weight ratio of the fully dissociatable salt to the buffering salt within the range of from about 4:1 to about 30:1.

The acidulent compositions just described are employed to give a vinegar flavor to a wide variety of food products which can be made from dry mixes. In addition to the acidulent composition, the dry food mixes of the invention will comprise a flavoring component comprising spices and a thickening component.

Preferred among the various flavoring components are those which are available in dry form. Some of those preferred are black pepper, celery, cinnamon, clove, cumin, egg yolk, garlic, milk, mustard, nutmeg, onion, oregano, paprika, parsley, tomato, tumeric, and mixtures of at least two of these. Any other spices and vegetable products available in dry form can also be employed as long as they don't unduly increase the hygroscopicity of the composition. For example, in addition to black pepper, there are white pepper, various dried bell peppers, hot peppers of a number of varieties, and the like. Also various other spices can be employed as desired for taste. It is important that the various flavorings be capable of dry blending, so granular or particulate forms desired. However, some materials are important also for their mouthfeel when hydrated or their visual impact, and these factors will be taken into account for them.

The thickening component will be one which is easily hydratable and provides the mouthfeel desired for the various final food product. Preferably, the thickening agent will comprise, in dry form, a member selected from the group consisting of flour, starch, vegetable gum, gelatin, pectin, and mixtures of at least two of these. The examples which follow will provide the skilled worker with guidelines as to materials and amounts.

The thickening component will be employed in an amount which is effective to impart the desired mouthfeel, typically from about 0.5 to about 10% (based on reconstituted weight), depending on the thickening agent and the mouthfeel desired. As a guideline in the preferred compositions which are intended to simulate a fatty mouthfeel without containing any fat, the thickening component should be present in an amount at least sufficient to provide a fatty sensation to an expert taste panel trained to determine this sensation. The preferred compositions will impart a mouthfeel similar to an oil-in-water emulsion as perceived by an expert taste panel trained to determine the same.

In one embodiment, the ingredients are combined in proper proportion to provide a mix which can be hydrated with from about 70 to about 85% by weight water to provide a creamy dressing having the texture of a stable oil-in-water emulsion. In this embodiment, the food grade acid comprises citric acid, the buffering salt comprises sodium citrate, and the fully dissociatable salt comprises sodium chloride, the acid being present in an amount of from about 4 to about 6% of the dry weight of ingredients. Among the creamy dressings of this embodiment are blue cheese, sour cream ranch-style, French, creamy Italian, and the like.

In another preferred embodiment, the ingredients are combined in proper proportion to provide a mix which can be hydrated with from about 50 to about 70% by weight water to provide a barbecue sauce. Again here, the food grade acid comprises citric acid, the buffering salt comprises sodium citrate, and the fully dissociatable salt comprises sodium chloride. But, in this embodiment, the acid is present in an amount of from about 7 to about 12% of the dry weight of ingredients. In addition to barbecue sauce, this embodiment can be used to prepare mixes for other sauces.

In yet another specific, preferred embodiment, the ingredients are combined in proper proportion to provide a mix which can be hydrated with from about 80 to about 90% by weight water to provide a liquid salad dressing. Here, the food grade acid comprises citric acid, the buffering salt comprises sodium citrate, and the fully dissociatable salt comprises sodium chloride, the acid being present in an amount of from about 12 to about 18% of the dry weight of ingredients. This embodiment is especially good for Italian dressings and can be employed to form a low sodium version where the food grade acid comprises citric acid, the buffering salt comprises potassium citrate, and the fully dissociatable salt comprises potassium chloride.

The mixes and other compositions of the invention are prepared by simple dry blending, such as in a ribbon blender or a V-blender, for times effective to form a uniform mixture. Once the uniform mixture is formed, it can be packaged on conventional equipment, such as is now used for packaging dry mixes for soft drinks and salad dressings. The packaging material of choice is a laminate of paper, aluminum foil and polyethylene. This material forms a highly moisture-resistant package by simple heat sealing techniques.

The following examples are presented for the purpose of further illustrating and explaining the invention, and are not to be taken as limiting in any regard. Unless otherwise indicated, all parts and percentages are based on the weight of the components at the stage of processing indicated.

EXAMPLE 1

This example describes the preparation of a mix for a sour cream ranch-style dressing. When mixed with water, the dressing exhibits a creamy texture similar in mouthfeel to an oil-containing commercial dressing of this type which has a stable oil-in-water emulsion. The ingredients listed below in TABLE 1 are added to a ribbon blender and mixed for a total of 15 minutes by the end of which a uniform blend is achieved. The resulting uniform blend is then loaded into the feed hopper of a horizontal packaging machine and packaged in about 50 gram portions which can be mixed with about 210 grams of water to form an eight ounce portion of dressing.

TABLE 1

| INGREDIENT | PARTS |
|---|---|
| Citric Acid | 04.5 |
| Sucrose | 13.5 |
| Sodium Citrate | 00.9 |
| Sodium Chloride | 24.6 |
| Mustard Flour | 01.9 |
| Garlic Powder | 03.9 |
| Xanthan Gum | 04.5 |
| Propylene Glycol Alginate | 00.9 |
| Onion Powder | 02.2 |
| Cloud (for opacity) | 03.3 |
| Egg Yolk Solids | 04.5 |
| Black Pepper | 01.6 |
| Parsley Granules | 00.6 |
| Whey | 20.1 |
| Cold-water-dispersible Starch | 13.4 |
| Monosodium Glutamate | 08.9 |

EXAMPLE 2

This example describes the preparation of a mix for a French-style dressing. When mixed with the indicated amount of water, the dressing exhibits a creamy texture similar in mouthfeel to an oil-containing commercial dressing of this type which has a stable oil-in-water emulsion. The ingredients listed below in TABLE 2 are mixed and packaged as those in Example 1. The mix is packaged in about 75 gram portions which can be mixed with about 200 grams of water to form an eight ounce portion of French dressing.

TABLE 2

| INGREDIENT | PARTS |
|---|---|
| Citric Acid | 05.8 |
| Sucrose | 70.8 |
| Sodium Citrate | 01.0 |
| Sodium Chloride | 15.2 |
| Mustard Flour | 02.0 |
| Garlic Powder | 00.7 |
| Xanthan Gum | 02.6 |
| Propylene Glycol Alginate | 00.6 |
| Onion Powder | 00.5 |
| Cloud (for opacity) | 00.8 |
| Yellow Color | 01.2 |

EXAMPLE 3

This example describes the preparation of a mix for a barbecue sauce. When mixed with the indicated amount of water, the sauce has a rich tomato flavor and a pleasant sweet, vinegary flavor. The ingredients listed below in TABLE 3 are mixed and packaged as those in Example 1. The mix is packaged in about 140 gram portions which can be mixed with about 175 grams of water to form an eight ounce portion of barbecue sauce.

TABLE 3

| INGREDIENT | PARTS |
|---|---|
| Citric Acid | 10.0 |
| Sucrose | 51.2 |
| Tomato Powder | 10.0 |
| Sodium Citrate | 02.1 |
| Sodium Chloride | 08.2 |
| Mustard Flour | 02.0 |
| Garlic Powder | 00.5 |
| Xanthan Gum | 02.0 |
| Cold-water-dispersible Starch | 12.0 |
| Onion Powder | 00.5 |
| Cinnamon | 00.4 |
| Ground Cloves | 00.4 |
| Cloud (for opacity) | 00.8 |
| Red Color | 01.2 |

EXAMPLE 4

This example describes the preparation of a mix for an Italian salad dressing. When mixed with the indicated amount of water, the sauce has a tangy, vinegary flavor and a mouthfeel which can be characterized as that of a flowable oil in water emulsion. The ingredients listed below in TABLE 4 are mixed and packaged as those in Example 1. The mix is packaged in about 40 gram portions which can be mixed with about 210 grams of water to form an eight ounce portion of dressing.

TABLE 4

| INGREDIENT | PARTS |
|---|---|
| Citric Acid | 16.2 |
| Sucrose | 35.9 |
| Sodium Citrate | 02.6 |
| Sodium Chloride | 25.9 |
| Granulated Garlic | 09.7 |
| Xanthan Gum | 05.2 |
| Onion Powder | 01.9 |
| Black Pepper, ground | 00.6 |
| Oregano, ground | 01.3 |
| Paprika, ground | 00.3 |
| Parsley granules | 00.3 |

EXAMPLE 5

This example describes the preparation of a mix for a low-sodium Italian salad dressing. When mixed with the indicated amount of water, the sauce has a tangy, vinegary flavor and a mouthfeel which can be characterized as that of a flowable oil in water emulsion. The ingredients listed below in TABLE 5 are mixed and packaged as those in Example 1. The mix is packaged in about 40 gram portions which can be mixed with about 210 grams of water to form an eight ounce portion of dressing.

TABLE 5

| INGREDIENT | PARTS |
|---|---|
| Citric Acid | 16.2 |
| Sucrose | 35.9 |
| Potassium Citrate | 02.6 |
| Potassium Chloride | 25.9 |
| Granulated Garlic | 09.7 |
| Xanthan Gum | 05.2 |
| Onion Powder | 01.9 |
| Black Pepper, ground | 00.6 |
| Oregano, ground | 01.3 |
| Paprika, ground | 00.3 |
| Parsley granules | 00.3 |

The above description is for the purpose of teaching the person of ordinary skill in the art how to practice the invention, and it is not intended to detail all of those obvious modifications and variations of it which will become apparent to the skilled worker upon reading the description. It is intended, however, that all such obvious modifications and variations be included within the scope of the invention which is defined by the following claims. The claims are meant to cover the claimed elements and steps in any arrangement or sequence which is effective to meet the objectives there intended, unless the context specifically indicates the contrary.

I claim:

1. A dry food acidulent composition, having acid bite and profile reminiscent of vinegar when hydrated but essentially free of acetic acid and acetic acid salts, comprising:

dry food acid which comprises a member selected from the group consisting of adipic, citric, fumaric, malic, and mixtures of at least two of these;

at least one dry sodium or potassium buffering salt of at least one food-grade acid which comprises a member selected from the group consisting of sodium citrate, potassium citrate, disodium phosphate, dipostassium phosphate, and mixtures of at least two of these; and fully dissociatable salt comprising at least one of sodium or potassium chloride;

wherein the weight ratio of the buffering salt to the acid is within the range of from about 0.1:1 to about 0.3:1; the weight ratio of the fully dissociatable salt to the acid is within the range of from about 1:1 to about 6:1; and the weight ratio of the fully dissociatable salt to the buffering salt is within the range of from about 10:1 to about 30:1.

2. A dry mix for rehydrating with water to provide a food product, having acid bite and profile reminiscent of vinegar, comprising:

a dry acidulent comprising (I) a dry food-grade acid comprising a member selected from the group consisting of adipic, citric, fumaric, malic, and mixtures of at least two of these, (ii) at least one dry sodium or potassium buffering salt of at least one food-grade acid which comprises a member selected from the group consisting of sodium citrate, potassium citrate, disodium phosphate, dipostassium phosphate, and mixtures of at least two of these, and (iii) at least one fully dissociatable salt selected from the group consisting of sodium chloride, potassium chloride and mixtures of sodium and potassium chlorides;

wherein the weight ratio of the buffering salt to the acid is within the range of from about 0.1:1 to about 0.3:1, the weight ratio of the fully dissociatable salt to the acid is within the range of from about 1:1 to about 6:1, and the weight ratio of the fully dissociatable salt to the buffering salt is within the range of from about 4:1 to about 30:1;

a flavoring component comprising spices; and a thickening component.

3. A method for preparing a dry food mix which comprises combining the ingredients according to claim 2, wherein the dry acidulent is substitued for vinegar.

4. A dry mix according to claim 2 wherein the thickening component comprises, in dry form, a member selected from the group consisting of flour, starch, vegetable gum, gelatin, pectin, and mixtures of at least two of these.

5. A dry mix according to claim 2 wherein the dry food acidulent comprises:

a dry food-grade acid comprising a member selected from the group consisting of adipic, citric, fumaric, malic, and mixtures of at least two of these;

at least one dry sodium or potassium buffering salt of at least one food-grade acid which comprises a member selected from the group consisting of sodium citrate, potassium citrate, disodium phosphate, dipostassium phosphate, and mixtures of at least two of these; and at least one sodium or potassium salt of chloride;

wherein the weight ratio of the buffering salt to the acid is within the range of from about 0.1:1 to about 0.3:1; the weight ratio of the fully dissociatable salt to the acid is within the range of from about 1:1 to about 6:1; and the weight ratio of the fully dissociatable salt to the buffering salt is within the range of from about 4:1 to about 30:1.

6. A dry mix for rehydrating with water to form a food product, having acid bite and profile reminiscent of vinegar but essentially free of acetic acid or an acetic acid salt, comprising:

(a) a dry acidulent comprising (I) a dry food-grade acid comprising a member selected from the group consisting of adipic, citric, fumaric, malic, and mixtures of at least two of these, (ii) at least one dry sodium or potassium buffering salt of at least one food-grade acid which comprises a member selected from the group consisting of sodium citrate, potassium citrate, disodium phosphate, dipostassium phosphate, and mixtures of at least two of these, and (iii) fully dissociatable salt comprising at least one of sodium or potassium chloride;

wherein the weight ratio of the buffering salt to the acid is within the range of from about 0.1:1 to about 0.3:1, the weight ratio of the fully dissociatable salt to the acid is within the range of from about 1:1 to about 6:1, and the weight ratio of the fully dissociatable salt to the buffering salt is within the range of from about 4:1 to about 30:1;

(b) a flavoring component comprising one or more ingredient selected from the group consisting of black pepper, cinnamon, clove, egg yolk, garlic, milk, mustard, onion, oregano, paprika, parsley, tomato, and tumeric; and (c) a thickening component comprising, in dry form, a member selected from the group consisting of flour, starch, vegetable gum, gelatin, pectin, and mixtures of at least two of these.

7. A dry mix according to claim 6 wherein the ingredients are combined in proper proportion to provide a mix which can be hydrated with from about 70 to about 85% by weight water to provide a creamy dressing having the texture of a stable oil-in-water emulsion.

8. A dry mix according to claim 7 wherein the food grade acid comprises citric acid, the buffering salt comprises sodium citrate, and the fully dissociatable salt comprises sodium chloride, the acid being present in an amount of from about 4 to about 6% of the dry weight of ingredients.

9. A dry mix according to claim 6 wherein the ingredients are combined in proper proportion to provide a mix which can be hydrated with from about 50 to about 70% by weight water to provide a barbecue sauce.

10. A dry mix according to claim 9 wherein the food grade acid comprises citric acid, the buffering salt comprises sodium citrate, and the fully dissociatable salt comprises sodium chloride, the acid being present in an amount of from about 7 to about 12% of the dry weight of ingredients.

11. A dry mix according to claim 6 wherein the ingredients are combined in proper proportion to provide a mix which can be hydrated with from about 80 to about 90% by weight water to provide a liquid salad dressing.

12. A dry mix according to claim 11 wherein the food grade acid comprises citric acid, the buffering salt comprises sodium citrate, and the fully dissociatable salt comprises sodium chloride, the acid being present in an amount of from about 12 to about 18% of the dry weight of ingredients.

13. A dry mix according to claim 11 wherein the food grade acid comprises citric acid, the buffering salt comprises potassium citrate, and the fully dissociatable salt comprises potassium chloride, the acid being present in an amount of from about 12 to about 18% of the dry weight of ingredients.

* * * * *